May 28, 1963
H. C. GOODRIDGE
3,091,694
METHOD AND APPARATUS FOR MEASUREMENT OF TEMPERATURE
Filed March 23, 1960
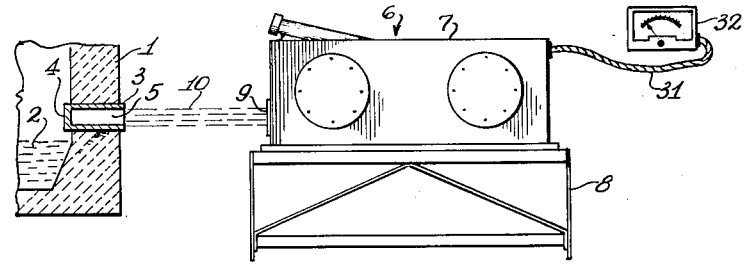
Fig. 1.
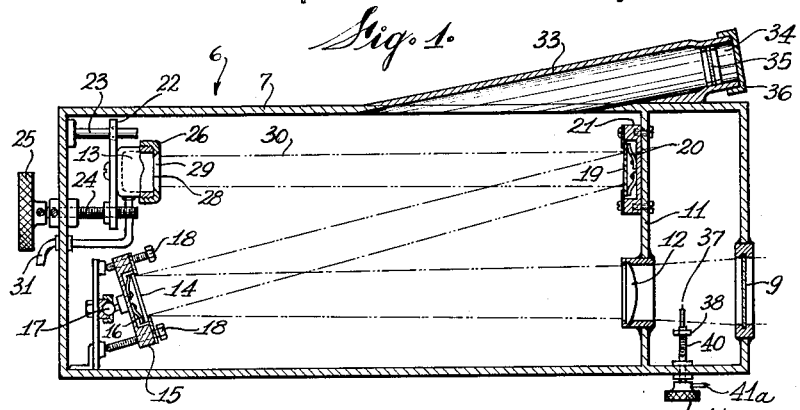
Fig. 2.
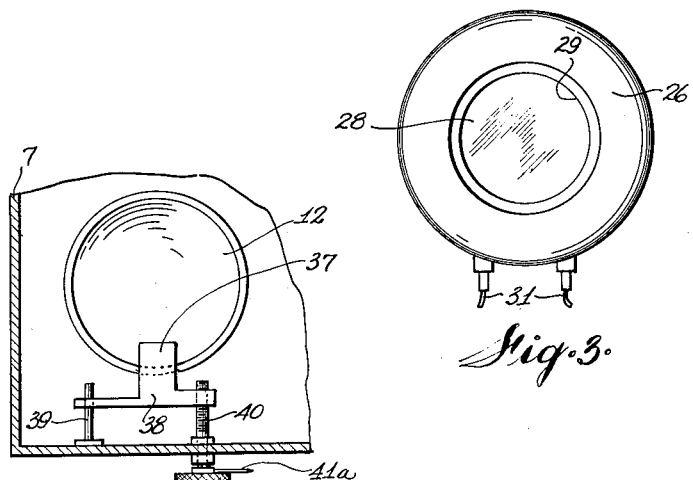
Fig. 3.
Fig. 4.
INVENTOR
Harold G. Goodridge
BY Alex E. MacRae
ATTORNEY United States Patent Office 3,091,694
Patented May 28, 1963

3,091,694
METHOD AND APPARATUS FOR MEASUREMENT OF TEMPERATURE
Harold C. Goodridge, Montreal, Quebec, Canada, assignor to Freeman-Goodridge Ltd., Montreal, Quebec, Canada
Filed Mar. 23, 1960, Ser. No. 17,010
5 Claims. (Cl. 250—83.3)

This invention relates to a method and apparatus for measurement of temperature of the charge in furnaces or the like whereby satisfactory control of such temperature may be effected.

The need for providing a constant and continuous reading of the temperature of a furnace charge whereby such temperature may be controlled has long been recognized. However, it is very difficult to provide a method and means for obtaining a measurement sufficiently accurate to ensure adequate control.

It is an object of this invention to provide a method of measuring the temperature of a furnace charge which is of simple nature and provides an accurate and continuous reading of such temperature and substantially regardless of the degree of the temperature range.

Another object is to provide an instrument for measuring the temperature of a furnace charge, which is simple in structure, which is not adversely affected by the temperature of the charge, and which provides an accurate and continuous reading of such temperature.

The invention will be described with reference to the accompanying drawing, in which FIGURE 1 is a side elevation, partly in section, of an apparatus in accordance with the invention, FIGURE 2 is a side elevation, partly in section, of an instrument constituting a part of the apparatus, FIGURE 3 is a front elevation of a photoelectric device constituting a part of the instrument, and FIGURE 4 is a front elevation of a lens controlling means.

Referring to the drawing, 1 indicates a furnace in which, by way of example, a body of molten metal 2 constitutes the body the temperature of which it is desired to ascertain by providing an accurate and constant measurement thereof. In this instance, a heat radiation transmitting member 3 is employed to transmit to the exterior of the furnace heat radiations in directly proportionate degree to those arising from the body 2. The member 3 is composed of a suitable refractory or other material of high thermal conductivity. As shown, it is in the form of a hollow, elongated member rectangular in cross-section having one end closed and constituting a radiation receiving element 4 and its other end 5 open. The member 3 extends through a wall or roof of the furnace with its closed end 4 exposed within the furnace and its open end 5 disposed exteriorly of the furnace. Preferably the member 3 does not protrude unduly into the furnace interior in order that it be not subjected to "false heat" such as radiations from the furnace heating source or the like, it being merely sufficient that the end 4 be exposed to the heat radiations of the melt 2.

An instrument 6 is provided to receive the heat radiations from member 3 and convert them into a measurable output.

As shown, the instrument 6 comprises a rectangular boxlike casing 7, mounted upon a suitable stand 8. Casing 7 has a window 9 in one end wall thereof and, as will be clear from FIG. 1, the casing is adapted to be supported on stand 8 with the window 9 in alignment with member 3 and directly opposite the closed end 4 thereof whereby the beams of heat radiations, as indicated at 10, will be directed longitudinally into the casing through window 9. It will also be apparent that the instrument 6 is completely remote from and in disconnected relation to the member 3 whereby there is no conduction of heat from the furnace to the instrument and thus no adverse effects are produced on such instrument by the furnace heat. Thus, the path of radiation beam 10 is unenclosed and, of course, uninterrupted.

Mounted in the casing 7 and adjacent the window 9 on a transverse partition 11 is a lens 12 in longitudinal alignment with the window 9. The lens 12 is arranged to receive the beam 10, as it passes through the window, and to focus the same upon a photoelectric cell 13 mounted on the other end wall of the casing.

Although the exact optimum ratios between area and distance of the radiation area source and the radiation receiver is required for accurate thermal measurements, the exact distance of lens 12 from radiation element 4 (the direct source of radiations 10) and the consequent distance of instrument 6 from member 3 and the furnace is not in itself critical and may be chosen to meet the convenience of any particular installation. Thus, the instrument may be distant from the furnace as little as 2 or 3 feet or as great as 60 to 80 feet or more.

For example, if the same area as the element 4 were to be reproduced on the cell 13, the distance between lens and cell would have to be the same as that between lens and element 4. However, this is unnecessary, it being merely sufficient to make a fixed and convenient reduction in the distance between lens and cell corresponding to a predetermined proportion of the element to lens distance, for instance 4:1. The focal length of the lens is determined accordingly. Moreover, since such reduced distance (lens to cell) may be still inconveniently long for practical purposes, whether it be in the construction of the sighting instrument or the space required for its positioning, it is proposed to further reduce such actual length while losing only a fixed and constant proportion of the energy of the radiations through reflection losses.

To this end, there are preferably provided a plurality of mirrors within casing 7. An inclined mirror 14 is mounted in longitudinal alignment with lens 12 adjacent the opposite end of the casing and below cell 13. Mirror 14 is carried by a frame 15 and is seated therein on springs 16 adapted to absorb shocks, movements due to expansion and contraction as a result of changes in temperature, and the like, whereby no undesirable change in the position of the mirror will take place during operation of the instrument. The mirror 14 is also preferably mounted for adjustment as to tilt and, as shown, this may comprise a ball and socket support 17 for the mirror and a plurality of adjusting screws 18. It will be apparent that mirror 14 is adapted to receive the beam of radiations from lens 12 with respect to a fixed optical axis and to reflect it in an upwardly inclined direction towards the other end of the casing. A second mirror 19, arranged to receive such reflected beam, is mounted adjacent the other end of the casing on partition 11 above lens 12. Mirror 19 is likewise seated upon shock and movement absorbing springs 20 in a frame 21. Mirror 19 may be mounted in fixed substantially vertical position with respect to the casing but, if desired, it may be provided with tilt adjustment means. As shown, mirror 19 is in longitudinal alignment with cell 13 and will reflect the radiation beam received thereby in a longitudinal direction through the casing and onto the cell 13.

In order to assist in calibration of the instrument, the photoelectric cell 13 is adjustably mounted as by means of a supporting plate 22 to which the cell is fixed and reciprocally carried on a bar 23 and a screw-threaded rod 24. Rod 24 is provided with a turning knob 25 externally of the casing 7 whereby the cell may be moved forwardly or rearwardly as desired.

A most important feature of the invention resides in the provision of means for ensuring that a sharply defined beam of radiations of predetermined cross-sectional area will be directed upon the cell 13. It has been determined that, if a beam of radiations, uncontrolled as to its cross-sectional area, is directed upon the cell, and whether such area is greater or less than that of the cell, the output of the cell is not sharply defined to a desirable degree and as a result measurement of such output is not accurate. Since, therefore, the present invention is concerned with measurement of the intensity of the beam, it is proposed to place a control or valve member in the path of the beam just prior to its impingement on the cell, such member permitting passage of a fixed and unvarying cross-sectional portion only of the beam for impingement on the cell.

To this end, such a member comprises, as shown, an annular plate 26 having a marginal flange 27 which is mounted directly on and in contact with the forward end of the cell 13. Thus, the plate 26 overlies the sensitive surface 28 of the cell 13 with its opening 29 in axial alignment therewith and is within a fraction of an inch of such surface 28. The area of the opening 29 in the plate 26 is less than the area of the surface 28 but smaller than the cross-sectional area of the beam 30 directed thereupon. Thus, a fixed, unvarying, and predetermined area of radiation of such beam will be imposed on the excitation surface 28 of the cell.

The output of the cell 13 is applied through an electrical connection 31 to a meter 32 to provide a measurement of such output. The meter 32 is calibrated to provide a reading of the temperature of, in the instance shown, the melt 2. Since the intensity of the luminosity or incandescence of the element 4 and of the resultant beam 10 will vary in a known proportion with the temperature of the melt 2, and since the other pertinent factors (distance of element 4 from lens 12, distance of lens 12 from cell 13, etc.) are arbitrarily fixed, it will be apparent that calibration of the meter may be effected in a simple manner.

Means are provided for viewing and sighting the cell 13. To this end, a tubular extension 33 of the casing is provided, such extension extending angularly from the side wall of the casing and having an opening 34 adjacent the end of the casing opposite cell 13. The opening is provided with a sighting window 35 having a dustproof removable cap 36. It will be apparent that the axis of the window and the extension 33 intersects the axis of the cell to provide a view thereof.

As is generally known, metals, ceramics, and other materials possess varying degrees of heat emissivity when subjected to identical temperatures. For this reason, it is desirable to facilitate calibration of the instrument by providing means for increasing or decreasing the collecting area of lens 12. Such means may comprise a shield 37 mounted in front of or behind (in front, as shown) lens 12 carried by a bracket 38. Bracket 38 (and shield 37) is mounted for reciprocal movement on a bar 39 fixed to casing 7 and a screw-threaded rod 40 provided with a turning knob 41 externally of the casing. It will be apparent that turning of the knob will move shield 37 into greater or less overlying relation with respect to lens 12. An indicating pointer 41a may be provided on the knob.

The current output, rather than the voltage output, of cell 13 is translated into degrees F. or C. by the meter 32. Thus, the output is not affected by variations in distance or wiring.

The cell 13 is of conventional character and the structure described permits use of only one such cell, thus simplifying the general structure.

The mirror arrangement described is utilized for reflecting purposes only in order to reduce the length or extent of the instrument.

The target or radiaion element 4 is of known thermal properties and is continually subject to the varying heat of the hot chamber or furnace and it radiates in a constant manner whereby, after calibration of the instrument, the resultant radiation may be translated to temperature degrees.

The radiation is collected into a single, undivided beam which continues uninterruptedly to the excitation surface of the cell 13.

The device described, because of its complete freedom from disturbing extraneous conditions and because of its sharply defined operation, provides a constant and continuous reading of the varying temperature of the charge. It has been found that such reading is accurate to within approximately 10° F. and usually within 5° F.

The embodiments of the invention in which an exclusive property or privilege is claimed are defined as follows.

I claim:

1. A device for measuring the temperature of a furnace charge by radiation from a predetermined radiation surface area which comprises a closed rectangular casing having end and side walls and a partition in parallel adjacent relation to one of said end walls, a lens mounted in said partition, a window in said end wall adjacent said partition in longitudinal alignment with said lens to permit passage therethrough of a radiation beam from said charge variable in cross-sectional area in accordance with the optical distance to said radiation surface area for reception by said lens, a light sensitive device having an excitation surface mounted on the other of said end walls in spaced relation thereto having a receiving area of a predetermined proportion to said radiation surface area, beam reflecting means in said casing for directing said beam onto said excitation surface to effectively increase the optical distance between said excitation surface and said lens, means for adjusting the position of said light sensitive device with respect to said other end wall to vary the effective distance of said excitation surface from said lens to maintain a predetermined distance ratio from said lens to excitation surface and lens to radiation surface area, a valve member mounted directly on said light sensitive device and having a portion overlying said excitation surface and an aperture in said portion in axial alignment with said excitation surface to define said receiving area, said aperture thereby having a smaller cross sectional receiving area than that of said excitation surface, and means for sighting said light sensitive device comprising a tubular extension extending angularly from one of said side walls and having an axis intersecting the axis of said light sensitive device, and a window in said extension in axial alignment with the axis thereof.

2. A measuring device as defined in claim 1, including means for varying the collecting area of said lens comprising a shield mounted on one of said side walls and having a portion located between said window and said lens to interrupt a portion of said beam, and means adjusting the height of said shield to vary the area of said shield portion.

3. In combination with a heat radiation transmitting element mounted on a furnace wall for transmitting heat radiation from a charge within a furnace at an elevated temperature; a temperature measuring device remotely located with respect to said furnace wall out of the heat radiation influence thereof for receiving internal temperature reflecting radiations from a predetermined surface area of said radiation transmiting element; said device comprising, enclosure means having an opening therein through which said temperature reflecting radiations pass, lens means mounted in said enclosure means in alignment with said opening for transmitting said temperature reflecting radiations at a predetermined reduced area to distance ratio, light sensitive receiver means adjustably spaced from said lens means for receiving temperature reflecting radiations on a receiver area, and optical means operatively disposed between said lens means and receiver means for effectively increasing the optical distance therebetween in relation to said receiver area to obtain said predetermined reduced area to distance ratio necessary to reflect the temperature of said charge within the furnace.

4. The combination of claim 3 wherein said optical means comprises spaced reflectors respectively aligned with the lens means and receiver means for extending said optical distance beyond the spacing between said lens means and receiver means.

5. The combination of claim 4 including sighting means optically intersecting radiations transmitted from one of said reflectors to the receiver means for aligning the opening in said enclosure means with said heat radiation transmitting element.

References Cited in the file of this patent

UNITED STATES PATENTS

| | | |
|---|---|---|
| 842,314 | Heeley et al. | Jan. 29, 1907 |
| 1,642,011 | Chubb | Sept. 13, 1927 |
| 1,788,849 | Schunemann | Jan. 13, 1931 |
| 2,357,193 | Harrison | Aug. 29, 1944 |
| 2,460,314 | Thomson | Feb. 1, 1949 |
| 2,516,672 | Brockman | July 25, 1950 |
| 2,573,870 | Pfund | Nov. 6, 1951 |
| 2,601,508 | Faste | June 24, 1952 |
| 2,745,966 | Verhoeff | May 15, 1956 |
| 2,869,369 | Howell | Jan. 20, 1959 |
| 2,989,638 | Loudon et al. | June 20, 1961 |